(No Model.)
W. H. PERRY.
APPARATUS FOR BAKING, ROASTING, AND STEAMING.
No. 448,886. Patented Mar. 24, 1891.
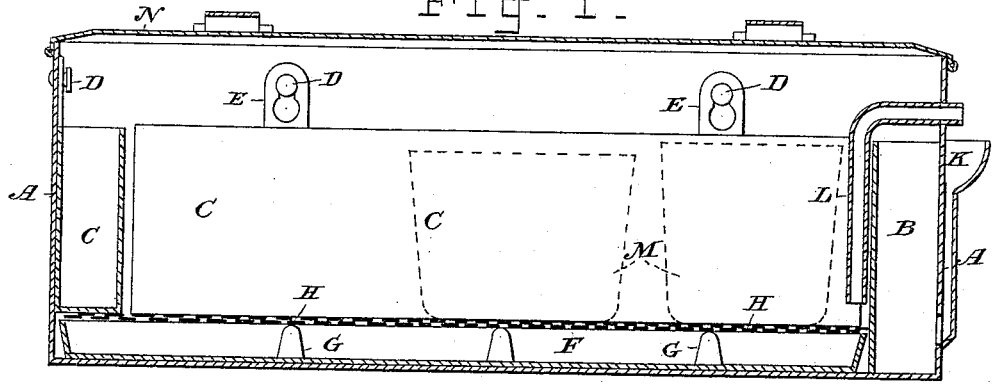
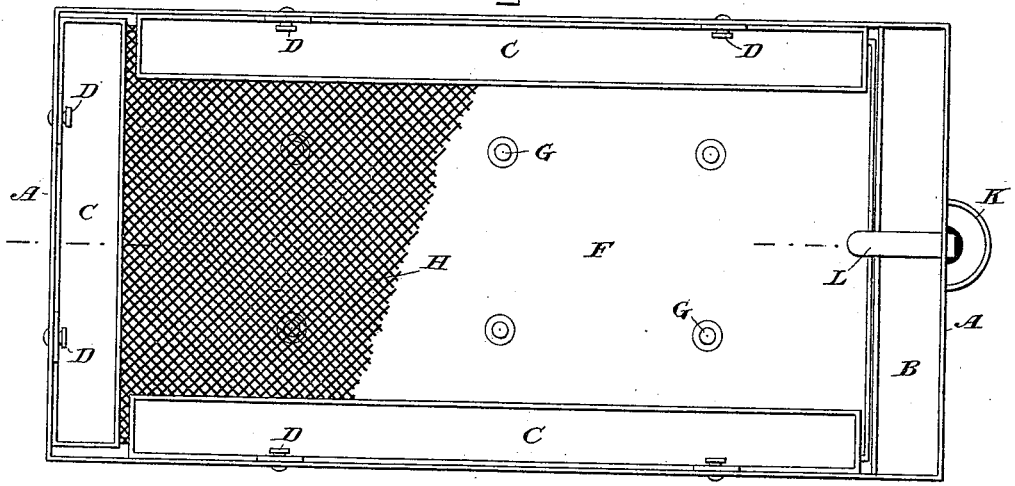
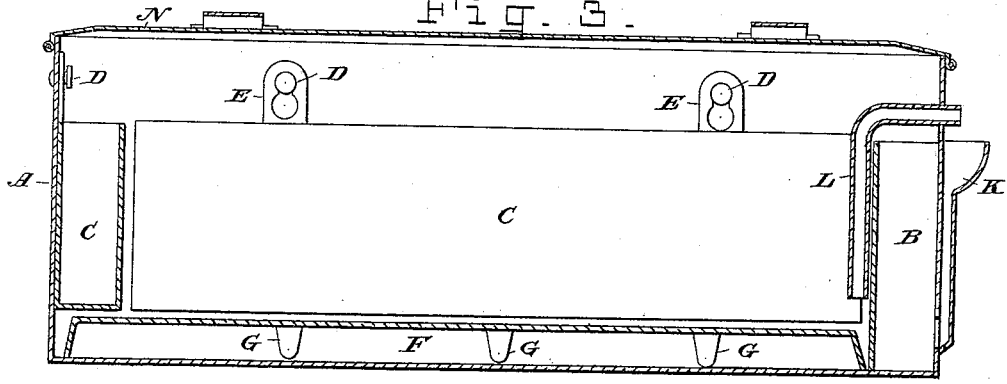
WITNESSES:
E. K. Bolton
C. L. Davis
INVENTOR:
Wilton H. Perry
By Marble, Mason & Canfield
his Attorneys.

UNITED STATES PATENT OFFICE.

WILTON H. PERRY, OF BROOKLYN, NEW YORK.

APPARATUS FOR BAKING, ROASTING, AND STEAMING.

SPECIFICATION forming part of Letters Patent No. 448,886, dated March 24, 1891.

Application filed July 16, 1890. Serial No. 358,942. (No model.)

*To all whom it may concern:*

Be it known that I, WILTON H. PERRY, a citizen of the United States of America, residing at the city of Brooklyn, in the county of Kings and State of New York, have invented a new and useful Improvement in Apparatus for Baking, Roasting, and Steaming, of which the following is a full, clear, and exact description, reference being had to the accompanying drawings, forming a part of this specification, wherein similar letters of reference designate like or equivalent parts wherever found throughout the several views, and in which—

Figure 1 represents a central vertical longitudinal section of my improved apparatus; Fig. 2, a top plan view thereof with a portion of one of the details broken away, and Fig. 3 a central vertical section of a modification of the arrangement of parts shown in Fig. 1.

It is well known in the culinary art that many articles require to be baked, roasted, or steamed by a slow process and a moist and low degree of heat, and it is frequently necessary to cook such articles at the same time and in the same oven with others requiring to be cooked quickly and by a much drier and higher degree of heat; and the object of my invention is to produce an apparatus by which this may be done, and which shall be simple and economical in construction, strong and durable, and efficient in operation.

Referring to the drawings, A represents a pan or tray drawn or stamped from sheet metal or formed in any desired manner, and B is a water-chamber, preferably formed integral with or permanently attached to and within the pan A, at one end thereof. C C represent removable water-vessels, also arranged within said pan A and adjoining the sides thereof and the end opposite the water-chamber B. These water-vessels may be retained in position by any desired means; but I prefer to provide the upper portion of the inner wall of the pan A with small-headed studs D, and the water-vessels C with straps or ears E, having longitudinal slots larger at the bottom than at the top, which are adapted to slip over said studs D and hold the vessels firmly in place.

Arranged within the pan A and forming a false bottom for the same is a removable shallow pan or receptacle F, preferably about an inch or less in depth, and provided with upwardly-extending projections G, which may be formed integral therewith or attached thereto in any desired manner, and upon these projections is preferably placed a wire-netting or other perforated plate or support H of any construction preferred.

The water-chamber B is provided with a spout or funnel-shaped passage K, through which the same may be filled with water at any time, and a pipe L, the purpose of which will be hereinafter explained, extends from near the false bottom F and wire support H upward and outward through or over the water-chamber B.

In practice the water-chamber B and water-vessels C C are filled or partially filled with water, as is also the receptacle constituting the false bottom F, and the material which it is desired to bake, roast, or otherwise prepare is preferably placed within vessels or receptacles M, samples of which are shown in dotted lines in Fig. 1, which are placed upon the wire netting or support H, and the lid or cover N, of any known or preferred form of construction, is then closed and the apparatus placed within the oven.

As the water in the various receptacles becomes heated, steam is generated, and, rising within the pan A, forces the air therein down to the bottom thereof and out through the tube L, and the receptacles M and the articles therein are surrounded by hot steam, after which the tube L acts as a vent to the steam generated, and thus prevents undue pressure within the pan.

The process here described is followed when the apparatus is to be used as a steamer or when it is required to bake or roast certain articles which require a great amount of moisture and a medium degree of heat; but when a higher degree of heat and less moisture are required I may dispense with one or more of the receptacles or water-vessels C C and employ only the false bottom F; or I may employ the arrangement of elements shown in Fig. 3, in which the false bottom is simply inverted, by which a dead-air chamber is formed beneath the same, or this arrangement, in connection with all the water-chambers, will be found advantageous under certain circumstances. The employment of the vessels C, or either of them, or of the tube L or the false bottom F, in the position shown in Fig. 1, with water therein, will depend largely upon the condition of the oven and the articles to be cooked or the quality and degree of heat required, as it will be apparent that the quality of the heat and the temperature thereof may be regulated almost at will by the employment of the various elements of the apparatus or a portion thereof in the manner described. Although I have shown the water-chamber B as formed integral with the pan A, for some purposes it may be preferable to have it of the same form and removable like the water-vessels C C. Likewise, although I have shown the false bottom F as occupying all the space within the pan A and extending underneath the removable water-vessels C C, it is evident that the vessels C C may be made to extend to the bottom of the pan A, as shown in dotted lines in Fig. 1, and the false bottom F would in such a form of construction only occupy the space within the same and the chamber B, and many other alterations and modifications in the construction and arrangement of the various parts of the apparatus may be made without departing from the scope of my invention.

Having thus fully described my invention, its construction, and operation, what I claim, and desire to secure by Letters Patent, is—

1. The combination, with the pan A, of the water-chamber B and one or more removable water-vessels C, arranged contiguous to the sides of the pan, substantially as shown and described.

2. The combination, with the pan A, of the water-chamber B, one or more removable water-vessels C, arranged contiguous to the sides of the pan, and the tube L, substantially as shown and described.

3. The combination, with the pan A, of the water-chamber B, one or more removable water-vessels C, arranged contiguous to the side of the pan, and the removable and reversible bottom F, substantially as shown and described.

4. The combination, with the pan A, of the water-chamber B, one or more removable water-vessels C, arranged contiguous to the side of the pan, the removable and reversible bottom F, and the tube L, substantially as shown and described.

5. The combination, with a pan A, of the water-chamber B, one or more removable water-vessels C, arranged contiguous to the side of the pan, the removable and reversible bottom F, and the support H, substantially as shown and described.

6. The combination, with the pan A, of one or more removable water-vessels C, arranged contiguous to the side of the pan, and the tube L, substantially as shown and described.

7. The combination, with the pan A, of one or more removable water-vessels C, arranged contiguous to the sides of the pan, the removable and reversible bottom F, and the tube L, substantially as shown and described.

WILTON H. PERRY.

Witnesses:
B. M. PERRY,
C. L. DAVIS.